July 8, 1969     E. R. THOMPSON     3,453,780

WEATHER SEALING INSERT FOR DOORS

Filed Feb. 5, 1968

INVENTOR.
EDWIN R. THOMPSON
BY
*W. B. Hartman*
ATTORNEY

United States Patent Office 3,453,780
Patented July 8, 1969

3,453,780
WEATHER SEALING INSERT FOR DOORS
Edwin R. Thompson, Canfield, Ohio, assignor, by mesne assignments, to Thompson-Canfield Inc., Canfield, Ohio, a corporation of Ohio
Filed Feb. 5, 1968, Ser. No. 703,119
Int. Cl. E04b *1/62;* E04f *21/06*
U.S. Cl. 49—482   4 Claims

ABSTRACT OF THE DISCLOSURE

A weather sealing insert for installation in a groove in the bottom edge of a door incorporating a flexible longitudinally ribbed sealing member having a rigid core and an integral resilient section with adjustment screws engaging angular portions of said resilient core for adjustably moving the weather sealing insert relative to said door.

---

This invention relates to a weather sealing insert for installation in the lower edge of a door such as a hinged door found in a dwelling house or the like. The principal object of the invention is the provision of a weather sealing insert that may be installed in a groove in the bottom of a door and adjusted as to its position in the bottom of the door so as to effectively engage a threshold or floor surface below the door.

A further object of the invention is the provision of a weather sealing insert construction for a door edge that may be easily installed in metal or wooden doors and adjusted relative thereto by a simple operation.

A still further object of the invention is the provision of a weather sealing insert construction adapted to be positioned in a door edge and wherein simple inexpensive components are employed in forming the same.

The weather sealing door construction disclosed herein is primarily intended for positioning in the bottom of a hinged door so that the weather sealing construction will extend out of the bottom of the door and contact the floor or threshold area beneath the door when the same is in closed position. The invention incorporates a readily insertable and adjustable weather sealing member and is so formed as to be capable of quick and easy installation in a door and equally rapid adjustment so as to effectively seal the door with respect to the threshold or floor area therebeneath.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

Brief summary of the invention

The resilient weather sealing device has a rigid member with outwardly sloping camming surfaces at each end. The device when positioned in a door slot is adapted to be resiliently urged outwardly. Separate means in the slot are adapted to cooperate with the camming surfaces to adjust the position of each end of the device by moving the end inwardly against the action of the resilient urging means.

The invention is illustrated in the accompanying drawing, wherein.

Figure 1:
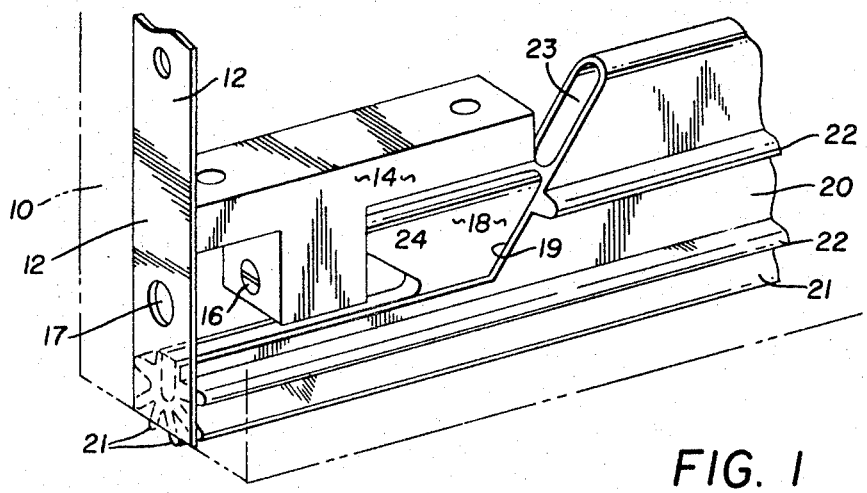
FIGURE 1 is a perspective elevation of an end portion of the weather sealing insert in the position in the lower corner of a door which is illustrated in broken lines.

By referring to the drawings in FIGURE 1 in particular, it will be seen that broken lines illustrate the lower right hand corner of a door 10 which has a longitudinally extending groove or slot 11 formed upwardly thereof in its lower edge. The ends of the slot 11 are closed by vertical plates 12 which are secured to the door by fasteners 13. A pair of oppositely disposed T-shaped brackets 14 are positioned one in each end of the slot 11 and secured to the door by fasteners 15. The vertical portion of the T-shaped brackets is drilled horizontally and receives an adjustment screw 16. Openings 17 in the vertical plates 12 enable a screwdriver to be positioned in engagement with the adjustment screws 16, so that the same may be moved inwardly and outwardly of the vertical portions of the T-headed brackets 14, as will occur to those skilled in the art.

A weather sealing device comprising a rigid core 18 positioned in an axial extending cavity 19 in a longitudinally extending resilient hollow plastic extrusion 20 is movably positioned in the slot 11 with its lowermost portion defining a plurality of longitudinally extending ribs 21, some of which are vertically disposed and others of which are angularly disposed and all of which are adapted to flexibly and sealingly engage a threshold or floor surface therebelow.

Figures 3, 4, 5:
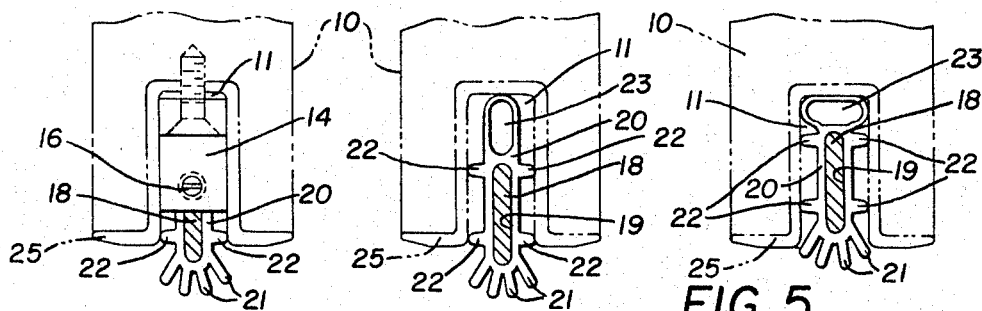
FIGURE 3 is a vertical section on line 3—3 of FIGURE 2.
FIGURE 4 is a vertical section on line 4—4 of FIGURE 2.
FIGURE 5 is a vertical section similar to FIGURE 4 and illustrating an alternate position of the weather sealing insert.

The resilient weather sealing member 20 also includes two pair of oppositely disposed longitudinally extending short flanges 22 positioned on the opposite sides of the resilient member 20 and acting as guide means holding the resilient member 20 and its rigid core 18 in desirable location in the slot 11, as best seen by referring to FIGURES 4 and 5 of the drawings. The upper longitudinal portion of the resilient member 20 defines an oval shaped cavity 23 which is shown in its normal oval shape in FIGURE 4 of the drawings and in distorted shape in FIGURE 5 of the drawing.

Figure 2:
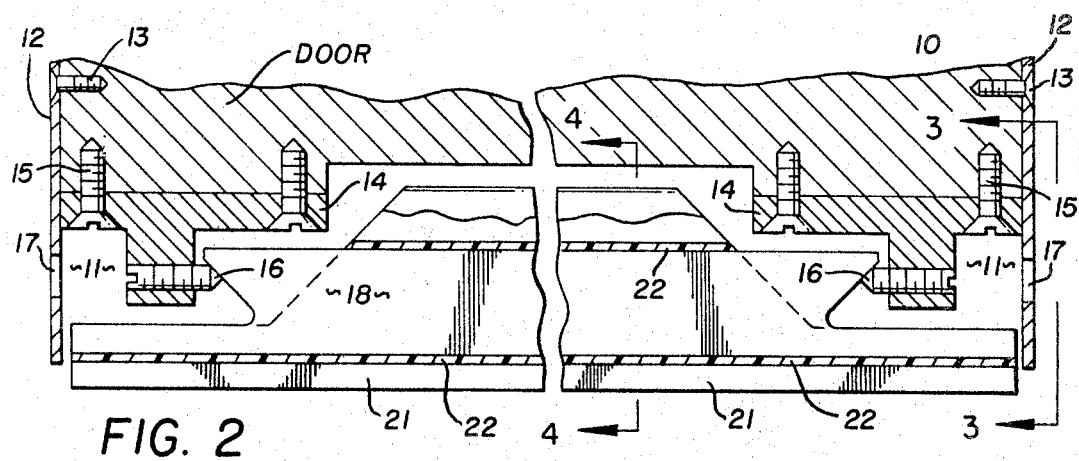
FIGURE 2 is a side elevation of the weather sealing insert with parts in cross section and parts broken away.

By referring now to FIGURE 2 of the drawings, it will be seen that the opposite ends of the rigid core 18 are cut back with respect from the opposite ends of the resilient member 20 and that an angular surface 24 is formed in the cut back area.

In FIGURE 1 of the drawings, the innermost tapered end of the adjustment screw 16 may be seen engaged against the angular portion 24 of the cutaway area of the rigid core member 18. It may also be seen in FIGURE 2 of the drawings at each end of the construction and it will occur to those skilled in the art that by rotating the adjustment screws 16 with a screwdriver positioned through the openings 17, as heretofore described, the vertical positioning of the weather sealing device may be varied so that the ribs 21 may be brought into engagement with the threshold or floor surface below the door.

By referring to FIGURES 4 and 5 of the drawings, it will be seen that the sealing device is positive and that in addition to contacting the floor or threshold below the door, the construction of the short flanges 22 is such that they effect closures between the portions of the door 10 defining the slot 11 and this is insured by the constant registry of the upper edge of the resilient member 18, which defines the oval cavity 23.

In FIGURES 3, 4 and 5 of the drawings, an inverted U-shaped slot defining member 25 is shown and it will occur that those skilled in the art that this particular member with its out turned flanges on its lower edges will be necessary in arranging the construction in an otherwise hollow metal door, such as commonly used in apartment house constructions and the like. In a wooden door, the slot 11 may be formed directly in the material of the door and the construction mounted directly therein.

It will occur to those skilled in the art that springs, such as leaf or coil may be substituted for the upper portion of the resilient member 20 is desired.

It will thus be seen that a weather sealing construction meeting the several objects of the invention has been disclosed and having thus described my invention, what I claim is:

1. A weather sealing device insertable in a slot in a door edge and consisting of an elongated resilient body member having at least one cavity axially thereof and a plurality of flexible ribs extending outwardly of one surface area thereof and disposed longitudinally, a rigid member in said axially cavity, resilient means between said rigid member and the base of the slot adapted to urge said body member outwardly of the slot, the opposite ends of said rigid member being shaped to form angular camming surfaces, mounting means in said slot in said door having separate means adjustably engaging said angular surfaces of said rigid member for moving said body member inwardly against the action of said resilient means and for independently adjusting the position of each end of said elongated resilient body member in said slot in said door edge with the plurality of flexible ribs extending outwardly of said slot.

2. The weather sealing device set forth in claim 1 and wherein said elongated resilient body member has at least one pair of oppositely disposed short flanges on its opposite sides for guiding and sealing registry with the sides of said slot in said door edge.

3. The weather sealing device set forth in claim 1 and wherein said mounting means in said slot in said door edge comprise brackets and said adjustable members thereof consist of screws having pointed ends engaging said angular surfaces of said rigid member.

4. A weather sealing device insertable in a slot in a door edge and consisting of an elongated resilient body member having at least one cavity axially thereof and a plurality of flexible ribs extending outwardly of one surface area thereof and disposed longitudinally, a rigid member in said axial cavity the opposite ends of said rigid member being shaped to form angular surfaces, mounting means in said slot in said door having members adjustably engaging said angular surfaces of said rigid member so as to adjustably position said elongated resilient body member in said slot in said door edge with said plurality of flexible ribs extending outwardly of said slot, said elongated resilient body member consisting of a flattened tubular shape having a longitudinal partition dividing the cavity thereof into two longitudinally extending areas and said rigid member being positioned in one of said longitudinally extending areas and said plurality of flexible ribs being formed on one of the edges of said flattened tubular shape and the short flanges being formed on the opposite flat sides of said flattened tubular shape.

References Cited

UNITED STATES PATENTS

| | | | |
|---|---|---|---|
| 1,561,195 | 11/1925 | Szymkowiak | 49—307 |
| 2,863,183 | 12/1958 | Carlson | 49—308 |
| 2,917,796 | 12/1959 | Kunkel | 49—482 X |
| 2,996,769 | 8/1961 | Kunkel | 49—307 |
| 3,114,946 | 12/1963 | Fluck | 49—482 X |
| 3,281,990 | 11/1966 | Nilsson | 49—306 |

DAVID J. WILLIAMOWSKY, *Primary Examiner.*

PHILIP C. KANNAN, *Assistant Examiner.*

U.S. Cl. X.R.

49—488, 489